April 6, 1926.

M. F. THOMA 1,579,414

DRAWING MECHANISM

Filed Oct. 18, 1924    4 Sheets-Sheet 1

Meinrad F. Thoma
By Attorneys
Southgate & Southgate.

April 6, 1926. 1,579,414
M. F. THOMA
DRAWING MECHANISM
Filed Oct. 18, 1924   4 Sheets-Sheet 4

Meinrad F. Thoma
By Attorneys
Southgate & Southgate

Patented Apr. 6, 1926.

1,579,414

UNITED STATES PATENT OFFICE.

MEINRAD F. THOMA, OF GHENT, BELGIUM.

DRAWING MECHANISM.

Application filed October 18, 1924. Serial No. 744,502.

*To all whom it may concern:*

Be it known that I, MEINRAD F. THOMA, a citizen of the Republic of Switzerland, residing at Ghent [Gand], Belgium, have invented a new and useful Drawing Mechanism, of which the following is a specification.

The present invention relates to drawing mechanism for drawing any kind of fibrous materials in the form of slivers or rovings and particularly to drawing frames in which the fibrous material is subjected to a drawing or stretching or extending effect in the stretching zone between a feeding device and a drawing device, ordinarily a pair of feed rollers and a pair of drawing rollers.

With such apparatus it is intended to guide the fibres within the stretching zone positively in order to reduce the percentage of the so-called "floating" fibres within said zone as much as possible. The expression "floating fibres" shall denote fibres which are free in the stretching zone i. e. which are not held by the two clamping points usually formed by the pair of drawing rollers and a pair of intermediate pressure rollers. Floating fibres have therefore a length which is smaller than the distance between the two clamping points and they may produce considerable irregularities in the thread as they are able to carry out accidental movements in the stretching zone.

The reduction of the percentage of the floating fibres permits either the increase of the drafting or, when maintaining an ordinary drafting, the spinning of a more short-stapled material to a yarn of the same quality as is otherwise obtained only by using a long-stapled material.

It has already been proposed to mount the intermediate roller as near as possible to the drawing roller in order to reduce the distance between the clamping points so that also shorter fibres are effectively clamped. As, however, fibrous materials and particularly cotton consist of single fibres of different lengths, the passage of the fibres through the stretching zone varies to a great extent; sometimes a great number of long fibres pass, at other times the short fibres are the more numerous. Further as the sliver or roving has already been twisted to some extent on the machines for preparing the roving, the stretching stresses between the clamping points vary continuously as long fibres stick together with more force than short fibres. The variation of the stretching stresses, which has not been taken into consideration up to the present is noticeable in the yarn and impairs the product. The reduction of the distance between the clamping points does not suffice to obtain a uniform product particularly when treating long-stapled material mixed with short-stapled material owing to these irregular stretching stresses.

Numerous experiments I have made have shown that a one-sided support and guidance of the fibrous material is quite sufficient to achieve a positive guidance of the latter; the fibres which are in direct contact with the guide means cause, by their cohesion with the other fibres of the roving, a perfect guidance of such other fibres.

The drawing mechanism according to the present invention is based on this knowledge and it comprises a plurality of curvatures, one joining on to the other, which alternately guide and support the fibrous material in a one sided manner almost over the whole extent of the stretching space. The change of the curvatures joining one to the other causes the positively guided fibres to act continuously on the floating fibres so that the latter are forced to carry out similar movements as the remaining fibres; the percentage of the floating fibres is thus very considerably reduced.

If further two intermediate pressure rollers are utilized of which the front roller is so near to the drawing roller that a clamping distance of approximately 8 millimetres is obtained, i. e. if the distance between the points in which the roving is a tangent to the drawing roller and to the front pressure roller is reduced, an increase of the drafting up to 30 can easily be obtained without impairing the product in the least. Furthermore, when maintaining the same drafting as with the hitherto known drawing frames, from 40 to 50% of a shorter-stapled material may be admixed with a normal stapled material and in spite of this a product may be obtained of a quality which up to the present could only be obtained with a specially selected material of uniform staple.

The plurality of curvatures joining one to the other cause by themselves a certain compensation of the stretching stresses acting on the single fibres. The invention consists further in utilizing these curvatures for obtaining an automatic control of the stretching stresses in dependency upon the length of the fibres which at the time being pass the stretching zone. This is achieved in that members which cause the curvatures in the stretching field are not rigidly mounted but are permitted to automatically adjust themselves according to the length of the fibres treated at a given moment. To this end in the preferred form, the front pressure roller is so mounted that it may move away from the drawing roller by rolling on the middle cylinder with which it co-operates. Thereby the curvature between the front pressure roller and the drawing roller becomes flatter, the clamping distance is increased and the stretching stress is reduced, when a larger number of longer fibres passes and vice versa. In a similar manner a bridge member, adjacent to the feed rollers and having a curved surface by which the roving is supported, may be displaceably arranged and may be pressed against the roving by the action of a light spring, whereby the stretching stress in the first part of the stretching zone is automatically regulated.

The invention further consists in providing pressure rollers the surface of which, in contradistinction to the known pressure rollers, is not smooth but is provided with grooves extending at right angles to the axis of the roller. If smooth steel rollers of a certain weight are used, it has been found that the drawing frame works in an efficient manner only with some numbers of yarn and certain kinds of fibres, with others it does not work well. The nearer the clamping points are to each other the lighter the pressure rollers should be as the quantity of fibres drawn through the field increases. If a heavy roller is utilized, for instance of a weight of 100 grammes, this roller does not allow sufficient slip, the fibres are clamped too much, are too much stretched, break and curl under the influence of their natural elasticity, whereby lumps or tufts are formed in the yarn. An increase of the clamping distance tends to overcome this drawback but it would present the other disadvantage that the percentage of the floating fibres increases.

If smooth pressure rollers of a weight of 40 grammes are utilized a larger slip is permitted with all numbers of yarn. However, as soon as even small impurities get into the bearings of the roller, the latter stops owing to its small weight or works in a jerky manner, whereby the yarn is even more impaired. The provision of the grooves extending at right angles to the axis ensures, with rollers of a weight of 100 grammes, a smooth running that is free of jerks and permits, in spite of the larger weight, a more pronounced slip so that the formation of tufts, which occurs with smooth rollers of this weight, is avoided.

The combination of the afore-mentioned features provides a drawing frame with which any fibrous materials such as cotton, wool, hemp, flax, artificial silk, nettle, staple fibres, viscose, cottonized flax, further all kinds of fibrous waste, may be effectively treated. The automatic regulation of the stretching stresses in accordance with the length of the treated fibres enables one to spin a much cheaper raw product into an equally high-class thread as hitherto has been possible only when utilizing selected raw-material. By means of this automatic regulation the drawing frame adapts itself to the fibrous materials treated, in contradistinction to the hitherto utilized method, in which the fibrous material had to be adapted to the drawing frame by a suitable selection of the fibrous material. The drawing frame according to the present invention results in a considerable saving in the spinning process and it may be adapted to all kinds of fibre treating apparatus, thus it may be equally well used with cotton drawing frames, cotton coarse flyers, medium flyers, fine flyers, double-fine-flyers, and with little modifications with carding engines, ring spinning machines, self actors and so on.

Constructional examples of the subject matter of the present invention are illustrated in the accompanying drawings in which

Fig. 11 is a plan view of Fig. 9;

Fig. 14 is a diagrammatic section through a double fine flyer;

Fig. 14ᵃ is a plan of a detail thereof;

Fig. 16 is a longitudinal section through a pressure roller of a drawing frame for a fine spinning machine;

Figures 1, 3, 4, 5, 6, 7, 8:
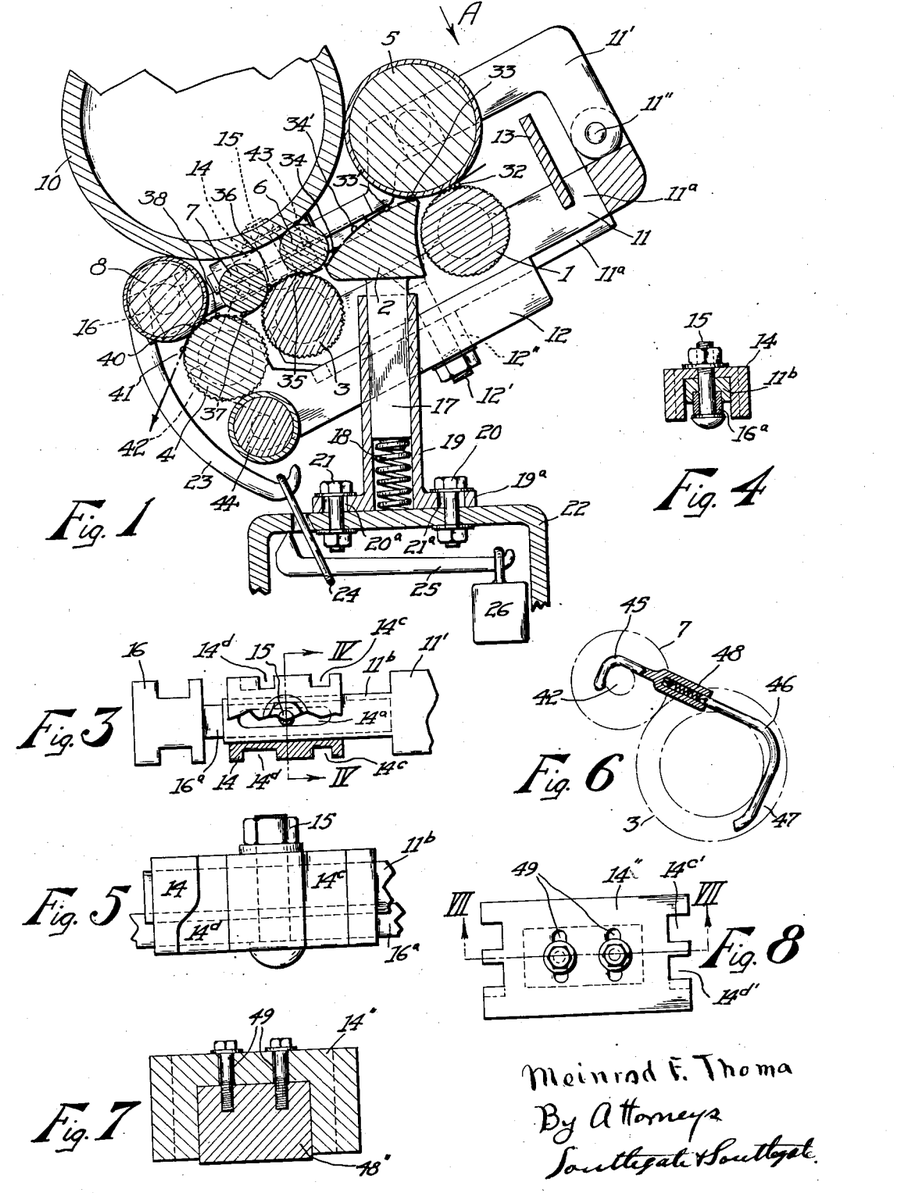
Fig. 1 is a vertical section through a drawing frame of the type used with ring spinning machines; of the latter only the bank is shown.
Figs. 3, 4 and 5 show in a horizontal section and in a cross section along line IV—IV in Fig. 3 and in elevation respectively details of the mounting of the pressure rollers.
Fig. 6 is a detail modification of Fig. 5.
Figs. 7 and 8 show in a section along line VII—VII of Fig. 8 and in a plan view respectively a bearing part for the pressure rollers used with a cotton drawing mechanism.
Figure 2:
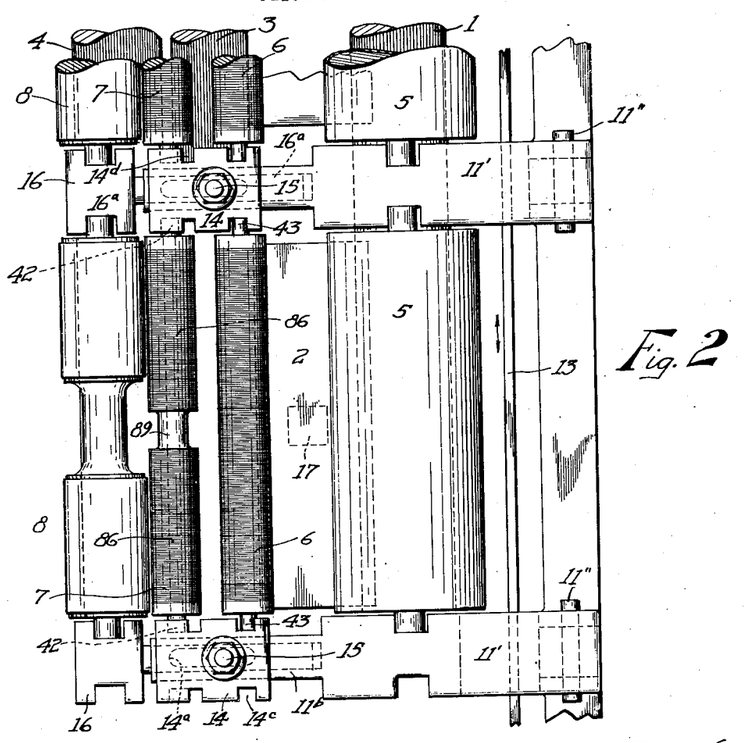
Fig. 2 is a plan view of Fig. 1 looking in the direction of the arrow A in Fig. 1.

In the constructional example illustrated in Figs. 1 to 5 steel cylinders or rollers 1, 3 and 4 are provided with grooves or flutes extending in the axial direction. The leather covered roller 5 co-operates with the roller 1 and they form together the pair of feed rollers, whilst the roller 4 and the leather covered roller 8 constitute the pair of drawing rollers. Further two pressure rollers 6 and 7 are provided which cooperate with the roller 3 and between the pressure roller 6 and the pair of feed rollers 1, 5 a yielding member 2, which may be termed a bridge member, having a softly curved surface is interposed to exert a self-adjusting pressure on the roving. As is shown in Fig. 1 the guide means i. e. the various rollers and the member 2 are so arranged that the roving shows several curvatures within the stretching zone, the curvatures join together and extend between the following points 34—35, 35—36, 36—37, and 37—38—40—41. The member 2 imparts to the roving the further curvature 33—34. By means of the guide means i. e. the rollers and the member 2, effecting the curvatures the roving is one-sidedly supported and guided partly from above and partly from below and nearly over the whole extent of the stretching field whereby an absolutely reliable guidance of the fibrous material is ensured which reduces the percentage of the "floating" fibres. The various curvatures are obtained by the following manner of mounting the different parts:

The cylinders 1 and 3 are mounted in bearings in the lower part 11 of a support, to which the upper part 11' is hinged at 11". In the upper part 11' the roller 5 is mounted and the bearing part 14 hereinafter described, in which the two pressure rollers 6 and 7 are mounted, is supported by the part 11' as well as a bearing part 16 in which the leather covered roller 8 is rotatable. The drawing roller 4 is mounted in an inclined support 12, which carries the supports 11, 11' and the latter are adapted to be displaced relatively to the support 12 so that the rollers 1, 3, 5, 6, and 7 may be brought nearer to or further away from the drawing roller 4. To this end the part 11 of the one support is guided in the support 12 by the aid of a straight edge 11ᵃ projecting from the former and slidable along a groove in the top of the support 12. It can be fixed in the adjusted positions by means of screw bolts 12' passing through slots 12" in the support 12.

The bearing part 16 for the leather covered roller 8 is so adjusted that the axis of the roller 8 is located beyond the vertical plane passing through the axis of the drawing roller by a small amount, approximately 2–3 millimetres, in order to enable the pressure roller 7 to be brought as near as possible to the drawing roller 4 and to be placed as low as possible so that the center of the pressure roller 7 is below that of the roller 6, whereby the curvature 38—40 is prolonged and the clamping distance 38—37 is decreased. In this manner it is possible to reduce the length of the tangent to the rollers 4 and 7 to approximately 8 millimetres. This reduction of the clamping distance causes a considerable reduction of the percentage of the floating fibres and renders possible the effective and faultless stretching of a short-stapled fibrous material.

One of the bearing parts 14, in which the two pressure rollers 6 and 7 are mounted, is shown in detail in Figs. 3–5. It consists of a cast-iron piece of U-shaped cross section and is placed over a projection 11ᵇ of the support 11', which projection is narrowed down for the reception of the bearing part 14. Below the projection 11ᵇ there is the continuation 16ᵃ of the bearing part 16 which carries the leather covered roller 8 and the three parts 14, 11ᵇ and 16 are secured together by a screw 15. In the bearing part 14 a slot 14ᵃ is provided which permits an adjustment of the bearing part 14 along the projection 11ᵇ whereby the two pressure rollers 6 and 7 can be moved nearer to or away from the drawing roller 4. In the bearing part 14 slots 14ᶜ and 14ᵈ are provided in which the pins 43 and 42 respectively of the pressure rollers 6 and 7 respectively are housed. The width of the slot 14ᶜ corresponds approximately to the diameter of the pin 43 while a portion of the slot 14ᵈ is curved concentric to the circumference of the cylinder 3, as is shown in Fig. 5, so that the roller 7 is permitted to adjust itself automatically in the direction towards the roller 6. The concentrically curved portion of the slot joins to a portion which is parallel to the slot 14ᶜ so that the roller can be conveniently removed from the bearing part 14 for cleaning purposes and the portion of the slot 14ᵈ which is parallel to the slot 14ᶜ is at such a distance from the latter that when the roller 7 is in its position nearest to the roller 6 the circumferences of the two rollers are still ½ millimetre apart from each other. During the automatic adjustment of the roller 7 the latter performs a rolling movement on the roller 3.

This possibility of the roller 7 adjusting itself permits an automatic regulation of the stretching stresses. If, for instance the roving passing at a certain moment contains a large percentage of long fibres the stretching stress tends to increase and the curvature 38—37—36 of the roving is flattened; the roller 7 is thereby lifted and it rolls on the cylinder 3 and the clamping distance is lengthened according to the longer fibres; if the roving has a large percentage of shorter fibres, the stretching stress decreases and the roller 7 takes up a lower position whereby the clamping distance is shortened; the roving is again more curved and the stretching stresses increase. The roller 7 thus adjusts itself automatically so that the stretching stress is maintained constant. In Fig. 1 the roller 7 is shown in its lowermost position. This automatic adjustment of the pressure roller 7 according to the length of the fibres permits the effective treatment of fibres of very different staples; a product is obtained from such fibres as has hitherto been produced only with selected fibres of an approximately uniform length.

The rolling movement of the roller 7 on the cylinder 3 when altering the clamping distance may also be caused by applying a double hook, as is shown in Fig. 6, which consists of a hook 45 placed around the pin 42 and a hook 46 partly embracing a groove 47 of the cylinder 3. The hook 46 is guided in the hook 45 and the hooks are held together by the tension of a spring 48 so that the double hook can conveniently be taken off when the roller 7 has to be removed.

The bridge member 2 is provided with a head of aluminum, having a slightly curved and polished surface. The head rests on a foot 17 of rectangular cross-section which is guided in a bearing bush 19. The latter is provided with a foot 19ª fixed to the bank 22 of a ring-spinning machine by means of the screw bolts 20 and 21. The latter pass through slots 20ª and 21ª so that a corresponding adjustment of the member 2 may be effected when the support 11, 11' together with the rollers 1, 3, 5, 6 and 7 is adjusted relatively to the drawing roller 4. The member 2 is pressed against the roving by weak spring 18, acting on the foot 17. Thereby a further automatic adjustment of the stretching stresses is achieved; when these stresses increase the member 2 is pressed in the downward direction whereby the points between which the roving contacts the surface of the member 2 are shifted from 33 and 34 respectively to 33' and 34' respectively. The stretching zone gets flattened and the stretching stresses are reduced as in the same period the fibres have to pass over a shorter length of path. When, on the other hand, the stretching stresses decrease owing to a large number of short fibres passing through the stretching zone, the member 2 is lifted by the action of the spring 18, the curvature of the zone is increased and similarly the stresses are increased. In Fig. 1 the member 2 is shown in its uppermost position in which a large percentage of short fibres pass the stretching zone.

The sensitiveness of this automatic regulation is very high and I have found by practical tests that it is advantageous to utilize springs of different strengths for the different numbers of yarn, for instance one spring for No. 10–20, another spring for No. 20–40 and a third spring for No. 40–80.

In Fig. 1, 23, 24 and 25 denote levers on which acts the weight 26, by which the leather covered roller 8 is loaded. 44 designates a cleaning roller for the drawing roller 4 which takes up the broken fibres, and 10 is the cleaning roller for the leather covered rollers 8 and 5 and for the pressure roller 6. The guide 13 serves for moving the roving to and fro in the stretching zone whereby the leather covered rollers are preserved.

Constructional details of the self weighted pressure rollers are illustrated in Figs. 15–22. The pressure rollers utilized in the drawing mechanisms for spinning machines have a weight of approximately 100 grammes, those for preliminary fibre treatment machines up to 1 kilogram, as lighter rollers do not revolve uniformly. In order that these rollers may permit an increase of the amount of fibres pulled through the stretching zone and not give an excessively intense clamping effect in spite of their comparatively high weight, but permit a certain slip, they are provided with grooves shown as extending around the rollers, the grooves having a depth of ¾ millimetres and may show any profile, types of which are illustrated in Figs. 18–22. The grooves do not extend over the whole length of the pressure rollers and the diameter of the grooved part of the pressure rollers is by 1/5 millimetre smaller than the diameter of the smooth part of the roller. Fibres may place themselves into the grooves without being subjected to the whole load whereby the slip of the fibres is materially increased. The most favorable profile is chosen according to the different structures of the fibres. Preferably they extend around at right angles to the axis of the roller.

Figure 15:
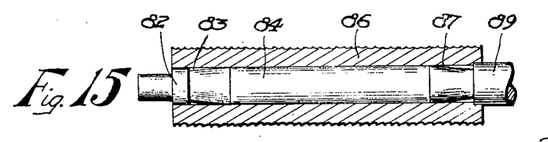
Fig. 15 is a longitudinal section through a pressure roller of a drawing frame for a coarse flyer.
Figure 17:
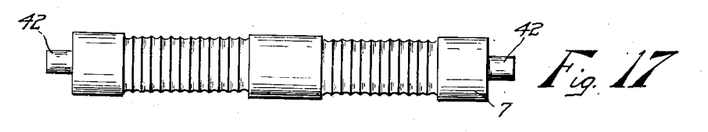
Fig. 17 is a view of a pressure roller.
Figure 18:
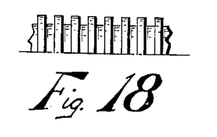
Figs. 18–22 show different profiles for the grooves of the pressure roller shown in Fig. 15.
Figure 19:
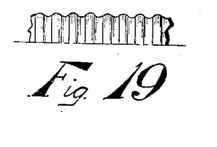
Figure 20:
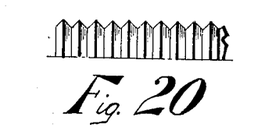
Figure 21:
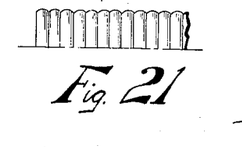
Figure 22:
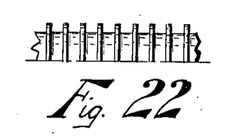

The fact that a roller must serve two or four spindles in ring-spinning machines presents the following drawback resulting from the various rovings differing sometimes in cross section. If two different rovings cooperate with one roller the thicker roving tends to increase the circumferential speed of the roller whereas the thinner roving has the opposite effect. A solid roller is therefore driven by the differential velocity of the two rovings and causes a friction action on both rovings resulting in irregularities in the spun material. This drawback is overcome by providing a separate roller body for every roving. Fig. 15 shows a constructional example of such a pressure roller; the axle of the roller is provided with two slightly curved parts 84 symmetrically arranged to a cylindrical middle portion 89. The roller bodies or sleeves 86, independently of each other, are pushed over the parts 84 so that they may revolve about the stationary axle 84, 89 at speeds which are independent of each other. 83 and 87 denote hollow spaces in which the lubricating material collects, a shoulder 89 and a collar 82 respectively closing these hollow spaces. The roller according to Fig. 15 is intended for a coarse flyer while Fig. 16 illustrates a smaller roller intended for a fine spinning machine. The roller 86ª shown in Fig. 16 is preferably made of aluminum and it may be made smooth. One of the pressure rollers illustrated in Fig. 2 possesses only one roller body while the other pressure roller and the pressure rollers in the constructional example shown in Figs. 9-11, which is described hereinafter, are each provided with two roller bodies.

In Figs. 7 and 8 the bearing part for the pressure rollers of a drawing mechanism for drawing cotton is illustrated. The bearing part resembles that shown in Figs. 3-5, inasmuch as the bearing part 14″ is provided with similar slots 14ᶜ′ and 14ᵈ′, in which the pins 42 and 43 of the rollers are housed. The U-shaped bearing part is screwed to the support 48″ and may be adjusted along the support for which purpose end slots 49 are provided in the bearing part 14″.

Figure 9:
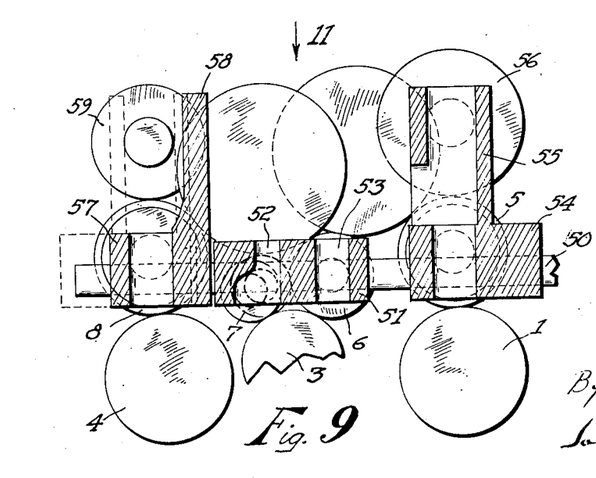
Fig. 9 is a vertical section through a drawing frame intended for a coarse flyer and a medium flyer.
Figure 10:
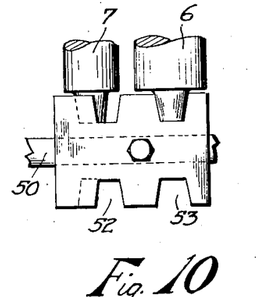
Fig. 10 is a plan view of a detail of the mounting of the pressure rollers of Fig. 9.
Figures 11, 14, 14A, 16:
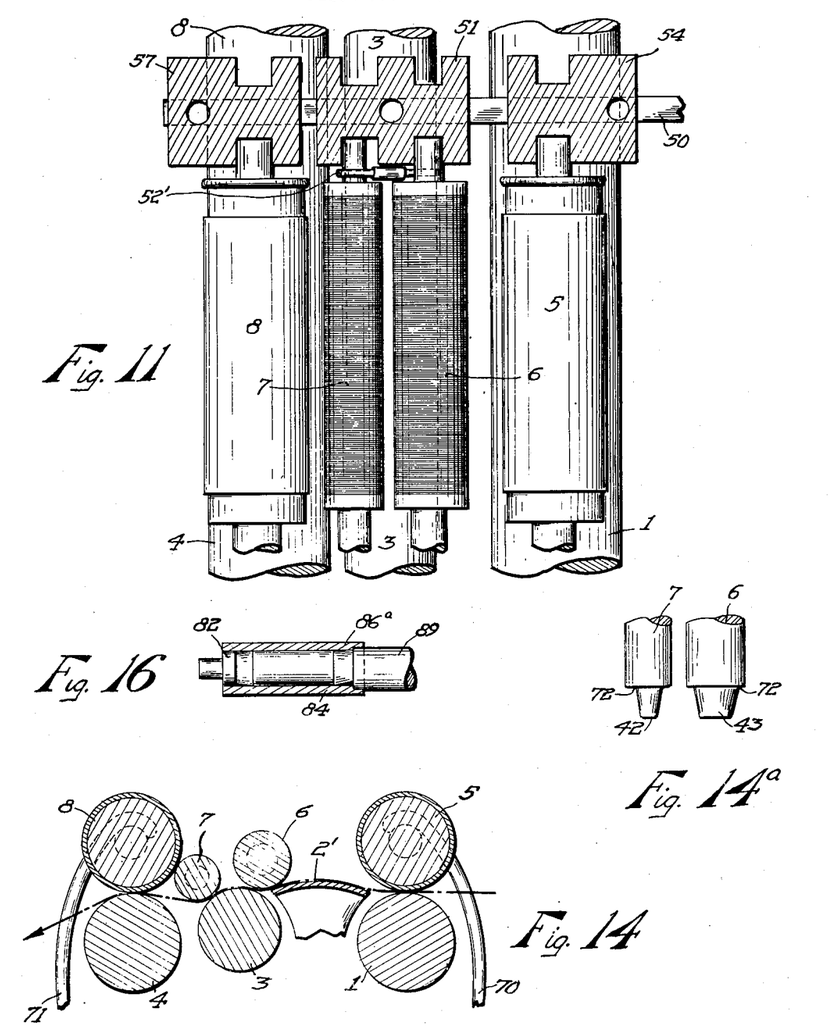

In Figs. 9-11 a drawing mechanism for a coarse flyer is diagrammatically illustrated. Rollers 1, 3, 4, 5, 6, 7 and 8 are provided as in the constructional example illustrated in Figs. 1-3, the member 2 is however omitted, as the drafting between the pairs of rollers 1, 5 and 3, 6 is a minimum amount. The manner in which the rollers 8 and 5 are loaded is not shown, it is effected in a simple manner by weights fixed to hooks which are hung from the rollers. The mounting of all the rollers is effected in bearing parts which are carried by a bar 50 and which may be adjusted along said bar. The bearing part 51 for the pressure rollers 6 and 7 is provided with slots 52 and 53 of which the slot 52 is of a greater width than the slot 53 so that the pressure roller 7 is able to move towards the pressure roller 6 in order to adjust the clamping distance. To cause the pressure roller 7 to perform rolling movements during this adjustment a hook 52′ of the type illustrated in Fig. 6 is utilized. On the bearing part 54 an extension 55 is provided in which the cleaning roller 56 is mounted, in a similar manner an extension 58 for mounting the cleaning roller 59 is provided on the bearing part 57 for the roller 8. The fluted rollers 1, 3 and 4 are mounted, in the same manner as described with the previous constructional examples, in a common support which is not illustrated in Fig. 9.

Figure 12:
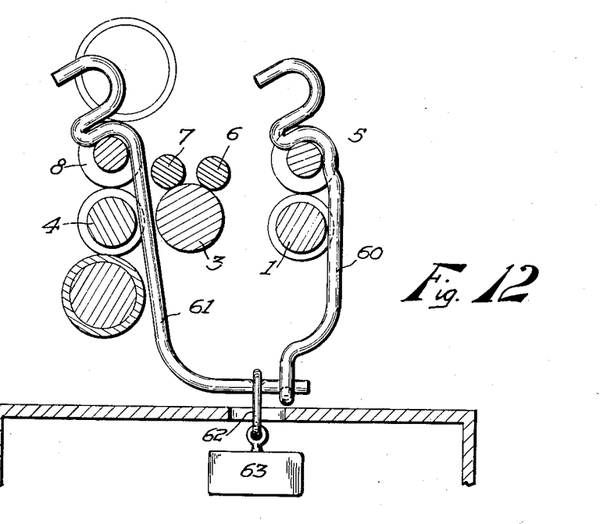
Fig. 12 shows diagrammatically a drawing frame for a self-actor.

Fig. 12 represents in a diagrammatic manner a drawing mechanism adapted to be utilized with self-actors, in which levers 60 and 61 are shown by which the rollers 5 and 8 are loaded by the use of a weight 63 suspended on a link 62. The manner in which the rollers 1, 3, 4, 5, 6, 7 and 8 are mounted is not illustrated as it does not materially differ from the above described examples. By turning the levers 60 and 61 the rollers 5 and 8 may be released without taking off the weight and can be removed for cleaning purposes.

Figure 13:
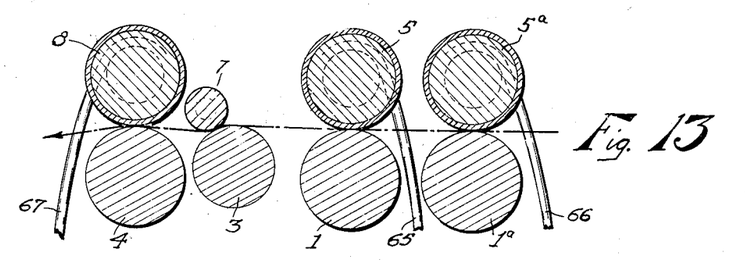
Fig. 13 is a diagrammatic section through a drawing mule.

Fig. 13 is a diagrammatic section through a drawing mechanism with which, besides the pair of rollers 1, 5, a further pair of rollers 1ª, 5ª is provided, in order to achieve the required increased stretching effect. The pairs of rollers 1, 5 1ª, 5ª and 4, 8 are positively loaded by means of the hooks 65, 66 and 67 respectively engaging the upper rollers 5, 5ª and 8 respectively. From the hooks weights (not shown in the drawings) are suspended. With the hitherto known drawing mechanisms of this type a single roller cooperates with the roller 3 and is loaded by means of a hook carrying a weight, whilst according to the present invention the self weighted pressure rollers 6 and 7 are provided at the same location. The roller 7 is adapted to adjust itself automatically in the manner described with the foregoing examples.

Fig. 14 shows diagrammatically a stretching mechanism for a double-fine-flyer. Pairs of rollers 1, 5 and 4, 8 are provided of which the rollers 5 and 8 are loaded by weights by means of hooks 70 and 71 respectively. The pressure rollers 6 and 7 cooperate with the roller 3 in the above described manner and replace the hitherto known positively loaded single roller. Further a member 2′ of a design similar to that of the bridge member 2 described with reference to Fig. 1 is provided.

The pins 42, 43 of the rollers 6 and 7 of the constructional example illustrated only in Fig. 14ª are conical and are well rounded at 72 where they join to the body of the rollers so that dust and foreign matter cannot adhere to them in the spot which is particularly subjected to a precipitation of dust.

If the pressure roller 6 be omitted then only the pressure roller 7 automatically adjusting itself will be used.

Although I have illustrated and described several forms of the invention I am aware of the fact that modifications can be made therein by any person skilled in the art without departing from the scope of the invention as expressed in the claims. Therefore, I do not wish to be limited to all the details of construction, but what I do claim is:—

1. A drawing mechanism for textile fibres comprising a pair of feed rollers, a middle roller and a pair of delivery rollers, in combination with a self-adjusting draught tension member which is located in position to deliver directly to one of the delivery rollers to avoid any material straight path of roving between them, and means for holding the tension member in contact with the middle roller under all conditions of stress.

2. A drawing mechanism for drawing any kind of fibrous materials comprising a feed device, a drawing device, and a guide means including an intermediate roller, and a pressure roller which is arranged closely adjacent to the drawing device, said guide means being so arranged in the stretching zone that the latter is composed of several curvatures one joining to the other and that the fibrous material is alternately guided first on one side and then on the other substantially over the whole extent of the stretching zone, and means for holding the intermediate roller and pressure roller against each other.

3. A drawing mechanism for drawing any kind of fibrous materials comprising a feed mechanism, a drawing mechanism, and guide means including two intermediate pressure rollers, and a fluted roller below which both of them engage, said guide means being so arranged in the stretching zone that the latter is composed of several curvatures one joining to the other and that the fibrous material is alternately guided on opposite sides substantially over the whole extent of the stretching zone and means for holding the front pressure roller against said fluted roller.

4. A drawing mechanism for textile fibres comprising a pair of feed rollers, a middle fluted roller and a pair of delivery rollers in combination with draught tension members, and means for holding the tension members against the fluted roller so that the fibrous material is supported between the feed rollers and the middle roller and guided alternately by the middle fluted roller with its two pressure rollers.

5. A drawing mechanism for textile fibres comprising a pair of feed rollers, a middle roller and a pair of delivery rollers in combination with draught tension members, and means for holding the tension members against the middle roller so that the fibrous material is supported between the feed rollers and the middle roller and guided alternately by the middle roller, and said draught tension members comprising a pair of pressure rollers, the forward one of which is mounted in bearings located so that it will lie next to the delivery roller so that it will deliver the roving thereto directly, and constructed and arranged to adjust itself automatically in its position relative to the delivery roller, such adjustment being controlled by the draught tension.

6. A drawing mechanism for textile fibres comprising a pair of feed rollers, a middle roller and a pair of delivery rollers in combination with draught tension members, and means for holding the tension members against the middle roller so that the fibrous material is supported between the feed rollers and the middle roller and guided alternately by the middle roller, and said draught tension members comprising a pair of pressure rollers, the forward one of which is mounted in bearings located so that it will lie next to the delivery roller so that it will deliver the roving thereto directly, said bearings being constructed to permit the pressure roller to roll toward and from the delivery roller around the circumference of the intermediate roller in accordance with the tension.

7. A drawing mechanism for drawing fibrous materials comprising a feed device, a drawing device, and guide means so arranged between them in the stretching zone that the latter is composed of several curvatures and that the fibrous material is alternately guided on opposite sides continuously, said guide means including two intermediate pressure rollers, and a lower fluted roller against which the pressure rollers both bear, the front pressure roller being aranged closely adjacent to the drawing device so as not to lose control of the roving between them, and means concentric with the fluted pressure roller for holding the front pressure roller against the fluted pressure roller so as to adjust itself automatically relatively to the drawing roller.

8. A drawing mechanism for drawing fibrous materials comprising a feed device, a pair of drawing rollers, and guide means so arranged in the stretching zone that the latter is composed of several curvatures and that the fibrous material is alternately guided on opposite sides throughout the draught zone, said guide means including two intermediate pressure rollers, and a lower roller against which they rest, the front pressure roller being arranged closely adjacent to the lower drawing roller and means for holding the front pressure roller against the fluted pressure roller so as to adjust itself automatically relatively to that drawing roller to regulate the clamping distance in dependency on the stretching stresses.

9. A drawing mechanism for drawing fibrous materials comprising a feed device, a drawing device, and guide means so arranged between them in the stretching zone that the latter is composed of several curvatures and that the fibrous material is alternately guided on opposite sides substantially continuously from the feed device to the drawing device, said guide means including a bridge member constituting the means for producing one of said curvatures and means for yieldingly supporting the bridge member to exert a slight pressure on the roving.

10. A drawing mechanism for drawing fibrous materials comprising a feed device, a pair of drawing rollers, and guide means so arranged in the stretching zone that the latter is composed of several curvatures and that the fibrous material is alternately guided on opposite sides throughout the draught zone, said guide means including two intermediate pressure rollers and a lower roller against which they rest, the front pressure roller being arranged closely adjacent to the lower drawing roller, and a tension regulator between the feed rollers and said lower roller constituting means for guiding the roving all the way from one to the other.

11. A drawing mechanism for drawing fibrous material comprising a pair of feed rollers, a pair of drawing rollers, a middle roller, and a draught tension member engaging the middle roller, said rollers being so arranged that the stretching zone is composed of several curvatures and that the fibrous material is alternately guided on opposite sides, the tension member being located in position to deliver directly to one of the drawing rollers, means for holding said tension member in contact with the middle roller under all conditions of stress, a bridge member between the feed rollers and the middle roller, and means for automatically adjusting the bridge member in accordance with the strain.

12. A drawing mechanism for drawing fibrous materials comprising a feed device, a drawing device, and guide means so arranged in the stretching zone that the latter is composed of several curvatures and that the fibrous material is alternately supported on different sides, said guide means including a bridge member and means whereby the bridge member is movably supported to automatically adjust itself in dependency on the stretching stresses to vary the length of the path of the roving in inverse ratio to the tension.

13. A drawing mechanism for drawing any kind of fibrous materials comprising a pair of feed rollers, a pair of drawing rollers, and guide means so arranged in the stretching zone that the latter is composed of several curvatures one joining the other and that the fibrous material is alternately guided on opposite sides almost over the whole extent of the stretching zone, said guide means including a bridge member, and a spring pressing upon it whereby it is adapted to automatically adjust itself in dependency on the stretching stresses, the spring acting on the bridge member being exchangeable.

14. A drawing mechanism for drawing fibrous material comprising feed rollers, drawing rollers and means extending all the way from the feed rollers to the drawing rollers for changing the curvature and length of the path of the roving automatically in accordance with the relative proportions of long and short fibres in the roving to maintain the stretching stress constant, said means including rollers between which the roving is held by the pressure of certain rollers on the others, and a bridge member extending from the feed rollers to the nearest roller to them and capable of exerting a yielding force on the roving.

15. A drawing mechanism for drawing any kind of fibrous materials comprising a pair of feed rollers, a pair of drawing rollers, and guide means so arranged in the stretching zone that the latter is composed of several curvatures one joining the other and that the fibrous material is alternately guided on opposite sides almost over the whole extent of the stretching zone, said guide means including a bridge member having a slightly convex surface and means in which said bridge is mounted, said means being adjustable relatively to the feed rollers.

16. A drawing mechanism for drawing any kind of fibrous materials comprising a pair of feed rollers, a pair of drawing rollers, and guide means so arranged in the stretching zone that the latter is composed of several curvatures one joining the other and that the fibrous material is alternately guided on opposite sides almost over the whole extent of the stretching zone, said guide means including two intermediate pressure rollers and an adjustable bridge member, the front pressure roller being arranged close to the drawing roller, and means whereby the front pressure roller will automatically adjust its position relatively to the drawing roller and thereby the clamping distance.

17. A drawing mechanism for drawing any kind of fibrous materials comprising a pair of feed rollers, a pair of drawing rollers, and guide means so arranged in the stretching zone that the latter is composed of several curvatures one joining the other and that the fibrous material is alternately guided on opposite sides almost over the whole extent of the stretching zone, said guide means including two intermediate pressure rollers, a bridge member, means whereby the bridge member is adapted to automatically adjust itself in dependency on the stretching stresses, the front pressure roller being arranged close to the drawing roller, and means whereby the front pressure roller will automatically adjust its position relatively to the drawing roller and thereby the clamping distance in dependency on the stretching stresses.

18. A drawing mechanism for drawing any kind of fibrous materials comprising a feed device, a pair of drawing rollers, and guide means so arranged in the stretching zone that the latter is composed of several curvatures and that the fibrous material is alternately guided on opposite sides in the stretching zone, said guide means including two intermediate pressure rollers, a bridge member mounted and adapted to automatically adjust itself in dependency on the stretching stresses, a spring acting on the bridge member, the front pressure roller being arranged close to the drawing roller and means whereby the front pressure roller is adapted to automatically adjust its position relatively to the drawing rollers and thereby the clamping distance in dependency on the stretching stresses, the spring influencing the bridge member being exchangeable.

19. A drawing mechanism for drawing fibrous materials comprising a feed device, a drawing device, and guide means so arranged in the stretching zone that the latter is composed of several curvatures one joining to the other and that the fibrous material is alternately guided on opposite sides, said guide means including an intermediate pressure roller provided with cylindrical working surfaces slightly lower than the bearing surfaces thereof.

20. A drawing mechanism for drawing fibrous materials comprising a pair of feed rollers, a pair of drawing rollers, and guide means so arranged in the stretching zone that the latter is composed of several curvatures one joining to the other and that the fibrous material is alternately guided on opposite sides almost over the whole extent of the stretching zone, said guide means including an intermediate pressure roller comprising sleeves, and stationary axles on which said sleeves are rotatably mounted, said sleeves being over their working surfaces provided with circumferential grooves, the diameter of the grooved part of the sleeve being slightly smaller than the diameter of the smooth part of the latter.

21. A drawing mechanism for drawing any kind of fibrous materials comprising a pair of feed rollers, a pair of drawing rollers, and guide means so arranged in the stretching zone that the latter is composed of several curvatures one joining to the other and that the fibrous material is alternately guided on opposite sides continuously almost over the whole extent of the stretching zone, said guide means including two intermediate pressure rollers and an adjustable bridge member, the front pressure roller being arranged to automatically adjust its position relatively to the drawing roller and thereby the clamping distance by the variation of the stretching stresses and the rollers being provided with grooves extending in the circumferential direction at right angles to the axis of the roller for increasing the slip of the fibres.

22. A drawing mechanism for drawing fibrous materials comprising a pair of feed rollers, a pair of drawing rollers, and guide means so arranged in the stretching zone that the latter is composed of several curvatures and that the fibrous material is alternately guided and supported first on one side and then on the other in the stretching zone, said guide means including two intermediate self-weighted pressure rollers, a bridge member and a spring for forcing the bridge member against the fibrous material adapted to adjust itself in dependency on the stretching stresses, the front pressure roller being adapted to automatically adjust its position relatively to the drawing roller and thereby the clamping distance in dependency on the stretching stresses, and the rollers being provided with grooves extending in the circumferential direction at right angles to the axis of the roller for increasing the slip of the fibres.

23. A drawing mechanism for drawing any kind of fibrous materials comprising a pair of feed rollers, a pair of drawing rollers, and guide means so arranged in the stretching zone that the latter is composed of several curvatures one joining to the other and that the fibrous material is alternately guided and supported almost over the whole extent of the stretching zone, said guide means including two intermediate pressure rollers and a yielding convex bridge member extending from the feed rollers to the first pressure roller adapted to adjust itself, in dependency on the stretching stresses, the front pressure roller being arranged to automatically adjust its position relatively to the drawing roller and thereby the clamping distance in dependency on the stretching stresses, and the rollers being provided with grooves extending in the circumferential direction at right angles to the axis of the roller for increasing the slip of the fibres, the pressure roller consisting of a number of sleeves rotatable independently, a separate sleeve being provided for every roving.

24. A drawing mechanism for drawing any kind of fibrous materials in stretching mules, comprising a pair of feed rollers, a pair of drawing rollers and two self-weighted intermediate pressure rollers, means whereby the front pressure roller will automatically adjust its position relatively to the drawing roller and thereby the clamping distance, the pressure rollers being provided with depressed cylindrical surfaces having grooves extending circumferentially at right angles to the axis of the rollers.

25. A drawing mechanism for drawing any kind of fibrous materials in stretching mules comprising a pair of feed rollers, a pair of drawing rollers and two self-weighted intermediate pressure rollers, means whereby the front roller will automatically adjust its position relatively to the drawing roller and thereby the clamping distance, the pressure rollers comprising sleeves, a separate one for each strand of roving, rotatable on stationary axles, the sleeves being provided with grooves extending circumferentially at right angles to the axis of the rollers.

In testimony whereof I have hereunto affixed my signature.

M. F. THOMA.